United States Patent [19]

Backers

[11] Patent Number: 4,934,990

[45] Date of Patent: Jun. 19, 1990

[54] APPARATUS FOR THE TORQUE-TRANSMITTING CONNECTION OF A PLURALITY OF MACHINE ELEMENTS

[76] Inventor: Heinz Backers, Auf dem Bült 42, D - 4477 Twist, Fed. Rep. of Germany

[21] Appl. No.: 324,404

[22] Filed: Mar. 15, 1989

[30] Foreign Application Priority Data

Mar. 17, 1988 [DE] Fed. Rep. of Germany ....... 3809027
Jun. 14, 1988 [DE] Fed. Rep. of Germany ....... 3820189

[51] Int. Cl.⁵ ............................................... F16H 55/30
[52] U.S. Cl. ........................................ 474/152; 464/57
[58] Field of Search ................. 474/152, 902, 903; 403/290, 344, 373, 375, 366; 464/54, 57, 61, 77, 58, 60; 74/111

[56] References Cited

U.S. PATENT DOCUMENTS

| | | | |
|---|---|---|---|
| 1,392,363 | 10/1921 | Shannon | 403/261 |
| 1,471,488 | 10/1923 | Karge | 464/58 |
| 2,175,473 | 10/1939 | Landrum | 464/60 |
| 2,574,714 | 11/1951 | Smith | 29/558 |
| 2,638,365 | 5/1953 | Jones | 403/366 |
| 2,680,383 | 6/1954 | Lahti | 464/57 X |
| 3,125,889 | 3/1964 | Perryman | 74/111 |
| 3,139,296 | 6/1964 | Greene | 403/373 |

FOREIGN PATENT DOCUMENTS

| | | |
|---|---|---|
| 129801 | 8/1901 | Fed. Rep. of Germany . |
| 1287377 | 1/1969 | Fed. Rep. of Germany . |
| 1525340 | 12/1969 | Fed. Rep. of Germany . |
| 1960276 | 4/1975 | Fed. Rep. of Germany . |
| 3219483 | 8/1983 | Fed. Rep. of Germany . |
| 750068 | 8/1933 | France . |
| 1148387 | 12/1957 | France . |
| 2568335 | 1/1986 | France . |
| 1476443 | 6/1977 | United Kingdom . |

Primary Examiner—Thuy M. Bui
Attorney, Agent, or Firm—Cook, Egan, McFarron & Manzo, Ltd.

[57] ABSTRACT

Apparatus is disclosed for the torque-transmitting connection of a plurality of machine elements generally, and in particular, to frictional torque transmission between a first machine element such as a shaft or a tool and a second machine element such as a gear wheel or a belt pulley wherein both elements are connected by a clamping element including at least elastic wrap spring which embraces one of the elements.

10 Claims, 9 Drawing Sheets

APPARATUS FOR THE TORQUE-TRANSMITTING CONNECTION OF A PLURALITY OF MACHINE ELEMENTS

DESCRIPTION

The invention relates to an apparatus for the torque-transmitting connection of a plurality of elements. More particularly, the present invention is related to frictional torque transmission between a first machine element such as a shaft or a tool and a second machine element such as a gear wheel or a belt pulley wherein both elements are connected by elastic clamping means such as a wrap spring.

The present invention primarily concerns the creation of a connection for the transmission of a torque from a driven shaft to a belt pulley, a gear wheel, a coupling or the like located thereon, and vice versa, that is a so-called shaft-hub connection. The apparatus of the present invention may also be used for the clamping and drive of a tool, namely, of a cutter or of a drill, by a work spindle of a machine tool.

Usually, a connection of the hub of a belt pulley or a gear wheel or the like to a shaft is performed positively by feather keys or cross pins. The disadvantages of these connecting elements and in particular the weakenings they cause, are long since known.

In order to obviate the disadvantages of these known positive connecting elements, frictional connections comprising clamping elements are known. For example, so-called annular spring clamping connections are used for the frictional connection of a shaft to the hub of a gear wheel or the like. These connections consist of two or more rings which are displaceable relative to each other on opposite inclined planes. A pushing-together of these rings causes an elastic deformation of the same in such a way that they brace the hub with respect to the shaft. These known clamping elements are disadvantageous in several respects. For one thing, they require at least one recess with accurate fit in the hub, which is not only laborious to produce, but also requires a relatively large wall thickness of the hub due to its space requirement. Furthermore, there is the danger that the bracing of the rings brought about by tightly screwing is gradually lost, particularly if the screws used for bracing become loose over time, due to vibrations or the like. Finally, the known clamping elements are relatively laborious in their production.

Thus, one object of the present invention is to develop an apparatus of the type mentioned above wherein its clamping element requires virtually no additional space and furthermore, can also be produced reliably and simply.

This is achieved by an apparatus of the present invention, as set forth in the appended claims. Designing the clamping element as a wrap spring achieves the effect that the torque to be transmitted is transmitted on the rope friction principle. The elastic properties of the wrap spring cause it to wrap even more firmly around the shaft or the tool with the increasing load, as a result of which the friction between the wrap spring and the tool or shaft also increases with the increasing load. The force transmission capacity of this apparatus consequently increases approximately proportionally to the load, as a result of which, in contrast with known annular spring clamping elements, no unnecessarily high prestresses are necessary. Rather, the bracing of the apparatus with respect to the shaft or the tool is adapted to the operating conditions.

Furthermore, in accordance with the present invention, the clamping element, designed as a wrap spring, has impact-absorbing effects due to its resilient properties. Load vibrations are for the most part compensated for. Also having an advantageous effect in the case of the apparatus according to the invention is the fact that initially the wrap spring must first deform elastically before a correspondingly high torque can be transmitted. Consequently, in particular when force is applied abruptly (for example during starting), a brief slipping-through is ensured, which contributes to reducing load peaks. As a result, for example a starting operation becomes more gentle, but at the same time an overloading of the apparatus is effectively avoided.

The wrap spring expediently has a plurality of windings. As a result, particularly high torques can be transmitted, it being possible by specific selection of the number of windings to dimension the apparatus appropriately for the requirements without any problem.

In the present invention, one end of the wrap spring is connected to a driving flange of a gear wheel, a belt pulley or other similar device, while the opposite end of the wrap spring is designed as a free end which is connected to the shaft or the tool. The connection of the end of the wrap spring to the shaft or the tool is preferably performed positively by said end which is in the form of a clamping ring. As a result, an easy assembly of the apparatus is possible by simply pushing the clamping ring onto the shaft or the tool and introduced into the wrap spring. A subsequent prestressing of the clamping ring at the free end of the wrap spring ensures that the last winding of the wrap spring, forming the clamping ring, does not significantly slip through upon force introduction, as a result of which the adjoining windings, directed toward the driving flange, can deform elastically for the full buildup of the frictional force necessary for force transmission. Alternatively, it is conceivable to connect the free end of the wrap spring positively to the shaft or the tool. Such a connection proves advantageous whenever a precise positioning of the wrap spring in longitudinal direction of the shaft or the like is necessary or a slipping-through at force peaks, in particular during starting, is to be avoided. In the case of such a positive connection of the wrap spring to the shaft or the like, it is possible, if desired, to dispense with a frictional bracing of the winding directed toward the free end of the wrap spring. Similarly, a connecting element used for the positive connection of the wrap spring to the shaft, tool or other similar device, in particular a grub screw or the like, may at the same time be designed as a shear pin.

Also, in a further embodiment of the present invention, a wrap spring is connected integrally to the gear wheel, the toothed belt pulley, the driving flange, or other similar device. The apparatus according to the invention is consequently an integral component of a machine element. As a result, the assembly is considerably facilitated.

Furthermore, with assignment of only one wrap spring to the machine element, a torque transmission from the shaft or the like or to the shaft only takes place in one direction. As a result, the apparatus of the present invention performs a type of free-running function, which is frequently desired in the case of such shaft-hub connections.

Alternatively, it is proposed to assign two wrap springs to a single gear wheel, single toothed belt pulley or other similar device, by the latter being connected integrally to the gear wheel or to the toothed belt pulley on opposite sides. In this case, the apparatus of the present invention makes possible a torque transmission in opposite directions.

In the present invention, the wrap springs are designed such that they form at the same time a hub of the machine element to be connected to the shaft or the like. As a result, the apparatus according to the invention is distinguished by particularly small outside dimensions, that is a compact design.

Furthermore, the individual windings are to be provided with a gradually decreasing cross section toward the free end of the wrap spring. As a result, the individual windings are adapted to the load occurring herein since, starting from the gear wheel, belt pulley or similar device, the load decreases toward the free end of the wrap spring. As a result, a uniform loading of the wrap spring over all windings is ensured, which for the most part eliminates overloads and resultant breakdowns. It is also achieved by the winding threads provided with different cross sections that the surface pressure exerted by the latter on the shaft or the tool under loading is substantially constant over the entire length of the wrap spring.

Finally, in the apparatus of the present invention, it is proposed to form the prestressing of the wrap spring necessary for frictional force transmission constantly, independent of load and, in particular, load direction. For this purpose, the wrap spring is assigned a clamping element, which turns the two opposite end windings of the wrap spring in opposite directions, in the direction of the windings, so that the diameter of the windings is reduced. By this relative turning of the end windings of the wrap spring, the individual windings of the same wrap themselves around the shaft to be driven or providing drive, as a result of which the frictional force necessary for the drive can be transmitted from the shaft to the wrap spring or vice versa. Since the prestressing applied by the clamping element to the wrap spring acts constantly in the direction of wrap, independently of the load and of the load direction, a friction torque transmission in opposite driving directions can be performed with a single wrap spring in the case of an apparatus of such design. In addition, by a correspondingly strong bracing of the wrap spring by the clamping element, a virtually slip-free starting can be performed.

Further subclaims relate to advantageous structural further developments of the wrap spring and of the clamping element for bracing of the same.

BRIEF DESCRIPTION OF THE DRAWING

Preferred exemplary embodiments of the apparatus are explained in more detail below with reference to the drawings, in which.

DESCRIPTION OF THE PREFERRED EMBODIMENTS

FIGS. 1 to 4 show an apparatus which is used for the transmission in particular of torques from a shaft (not shown) to a chain wheel 20 or vice versa. In this embodiment, the apparatus has a single wrap spring 21, which is connected integrally to the chain wheel 20.

In this present exemplary embodiment, the wrap spring 21 is formed out of a cylindrical hub 22, which protrudes with respect to one side of the chain wheel 20. A helical groove 23 running around in the hub 22 gives the wrap spring 21 a plurality of windings 24. In the exemplary embodiment shown, the wrap spring 21 has four windings 24.

Figure 4:
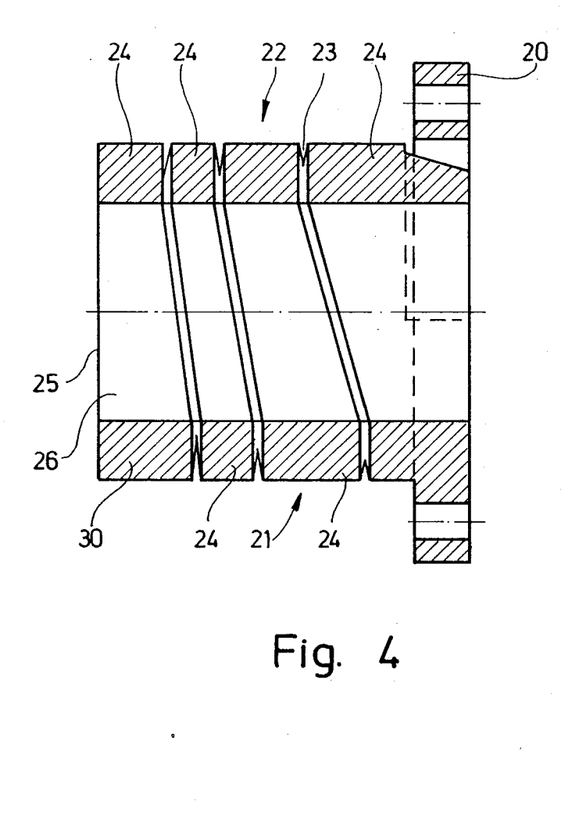
FIG. 4 shows a vertical section through the chain wheel and the wrap spring arranged thereon, according to FIG. 1.

The individual windings 24 have different cross sections in such a way that the cross sections of the windings 24 decrease gradually, starting from the chain wheel 20, toward a free end 25 of the wrap spring 21, as can be seen clearly in FIG. 4. The helical groove 23 of the wrap spring 21 consequently has a pitch which decreases continuously toward the free end 25.

By the formation described above of the wrap spring 21 from the cylindrical hub 22 provided with a groove 23 running around it, the windings 24 are, seen in cross section, rectangular, to be precise with uniform thickness running in radial direction, but decreasing in width with respect to the longitudinal direction for the wrap spring 21 toward the free end 25. Alternatively, it is also conceivable to provide the grooves 23 other than in the exemplary embodiment shown, not with narrow rectangular cross section but with V-shape cross section. In this case, the windings 24 have an approximately trapezoidal cross section.

The free end 25 of the wrap spring 21 is designed in a particular way. As can be seen in particular in FIGS. 1 and 3, the final winding 24 of the wrap spring 21, directed toward the free end 25, is in fact designed as a clamping ring 26. For this purpose, a free winding end 27 of the final winding 24 is braced by a screw 28 with the previous winding 24. This winding has for this purpose a thickened portion 30, which receives a screw head 29 of the screw 28 and ends some distance in front of the free winding end 27 for the formation of a gap 31 directed in the longitudinal direction of the wrap spring 21. By tightening the screw 28 and reducing the gap 31, the diameter of the clamping ring 23 can thus be reduced for the clamping-fast of the free end 25 of the wrap spring 21 on the shaft (not shown). As a result, on the one hand the apparatus is fixed in the longitudinal direction of the shaft, while on the other hand the free end 25 of the wrap ring 21 is held in the frame upon force introduction until the windings 24 have deformed for the buildup of the (rope) friction, necessary for the torque transmission, between the shaft and the hub 22 of the chain wheel 20, namely, of the wrap spring 21.

Figure 1:
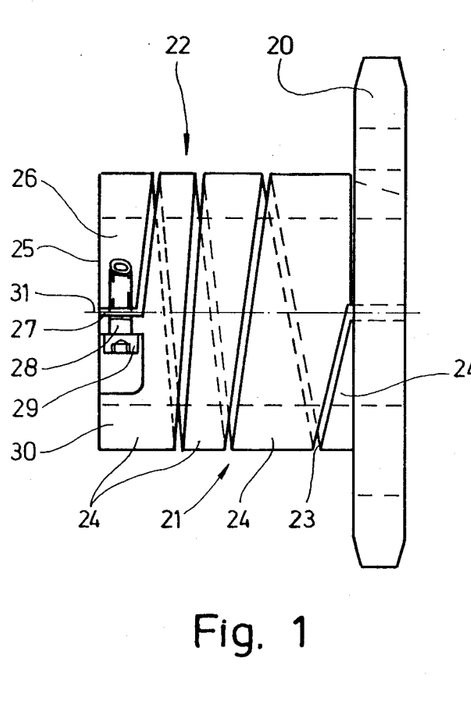
FIG. 1 shows a wrap spring arranged on a chain wheel.
Figure 2:
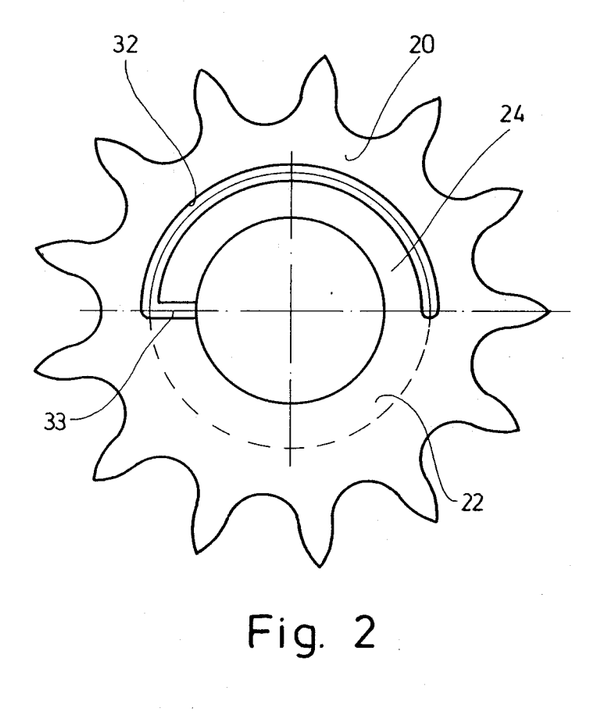
FIG. 2 shows a view of the chain wheel of FIG. 1 of the side facing away from the wrap spring.
Figure 3:
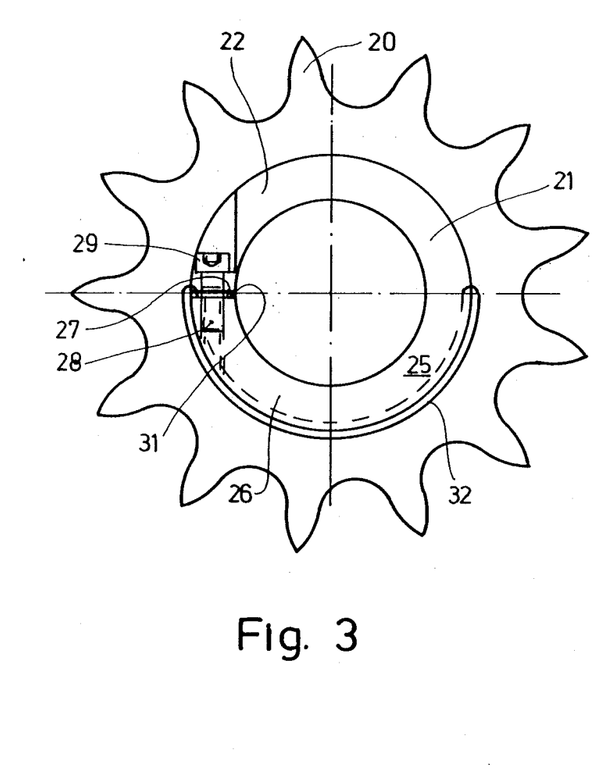
FIG. 3 shows a view of the chain wheel of FIG. 1 from the free end of the wrap spring.

As can be seen in particular in FIGS. 2 and 4, a part of the winding 24 is formed at an end of the wrap spring 21 opposite the free end 25 and connected to the chain wheel 20 by the body of the chain wheel 20. In the present exemplary embodiment, there is thus approximately half a winding 24 in the chain wheel 20. For this purpose, a groove in the chain wheel 20, which in the present exemplary embodiment is semicircular and continuous, has the effect of delimiting the half winding 24 formed in the said chain wheel with respect to the outer body of the chain wheel 20. This part of the winding 24 can thus spring freely in the body of the chain wheel 20. The emergence of the winding 24 from the chain wheel 20 is formed by a radially directed groove continuation 33 a one end of the semicircular groove 32 (FIG. 2).

Figure 5:
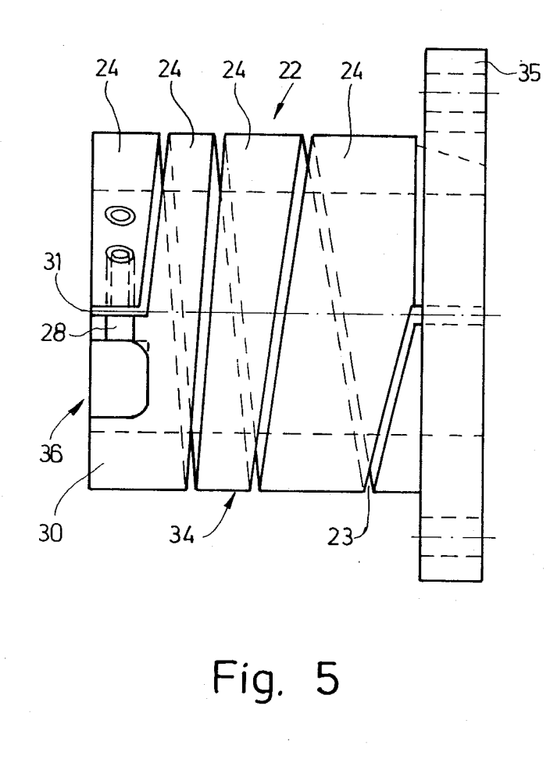
FIG. 5 shows a side view of an alternative embodiment of the wrap spring arranged on a driving flange.
Figure 6:
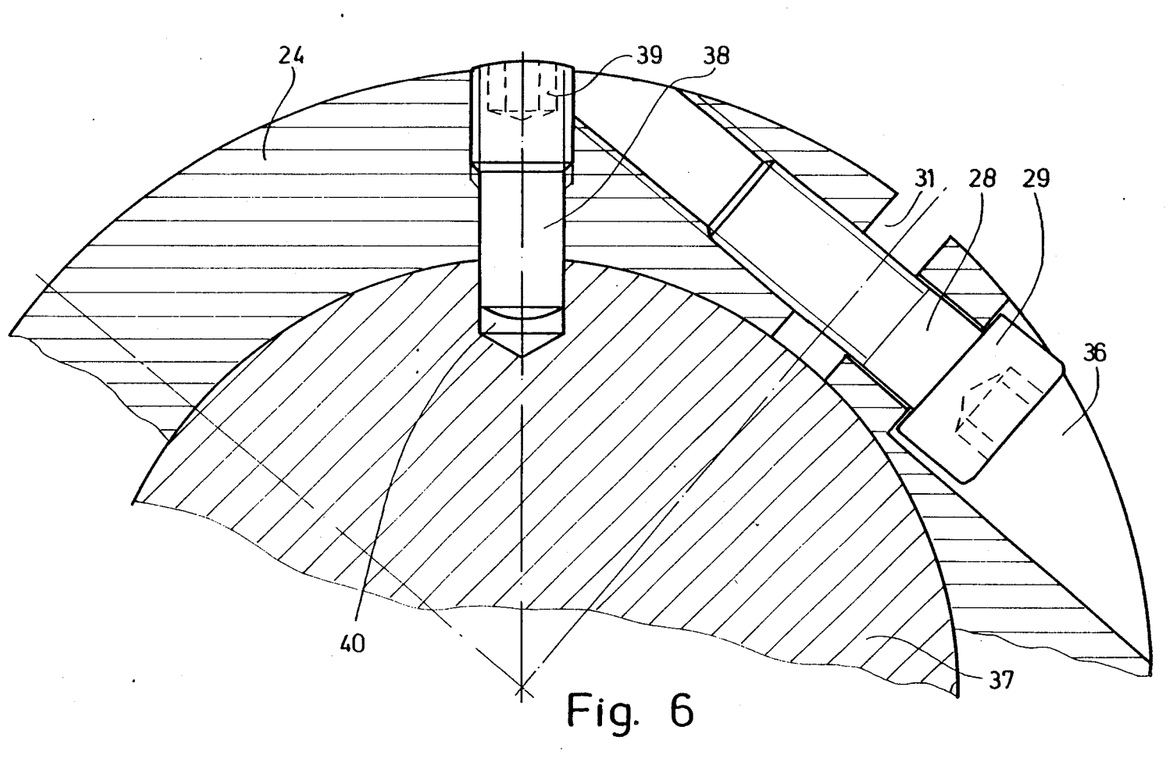
FIG. 6 shows an enlarged view of the free end of the wrap spring of FIG. 5 in the region of the fastening of the same on a shaft.

FIGS. 5 and 6 show a further exemplary embodiment of the apparatus, in which a wrap spring 34 is connected integrally to a driving flange 35. The design of the wrap spring 34 and the connection of the same to the driving flange 35 corresponds to the exemplary embodiment described above. The special features of the wrap spring is that it . . . (lacuna) an especially designed clamping ring 36, which makes possible and (additional) positive connection of the wrap spring 34 to a shaft 37, represented in an indicated way in FIG. 6. Consequently, in addition to the elastic bracing of the clamping spring 36 with respect to the shaft 37 by a screw 28, similar to the embodiment shown in FIGS. 1 through 4, a further screw, which is designed here as a grub screw 39 provided with a cylindrical extension 38, of the clamping ring 36 can be connected to the shaft 37 in such a way that the cylindrical extension 38 of the grub screw 39 protrudes, radially directed, to a corresponding blind bore 40 in the shaft 37. As a result, on the one hand an exact positioning of the wrap spring 34 with the driving flange 35 with respect to the shaft 37 is possible, to be precise in particular in axial direction of the shaft 37. Furthermore, it is achieved by the positive connection that the wrap spring 34 does not slip with respect to the shaft 37 during starting. By corresponding dimensioning of the grub screw 39, in particular of the cylindrical extension 38 on the same, the said screw may have a shear pin function for the avoidance of destructive effects on overloadings of the apparatus.

If use is made of the grub screw 39 for the positive connection of the wrap spring 34 to the shaft 37, it is possible alternatively to the embodiment shown to dispense with the screw 28 for the frictional connection of the wrap spring 34 to the shaft 37. In this case, the thickened portion 30 in the region of the winding 24 following on from the free winding end 27 is superfluous. As a result, the wrap spring 34 is more compact in its design and also simpler to produce.

The exemplary embodiments of the apparatus described above and shown in FIGS. 5 and 6 make possible the transmission of a torque or the like in only one direction, namely, in the direction of the windings. In this case, the drive force causes the windings 24 to deform elastically in the sense of pressing against the shaft.

Figure 7:
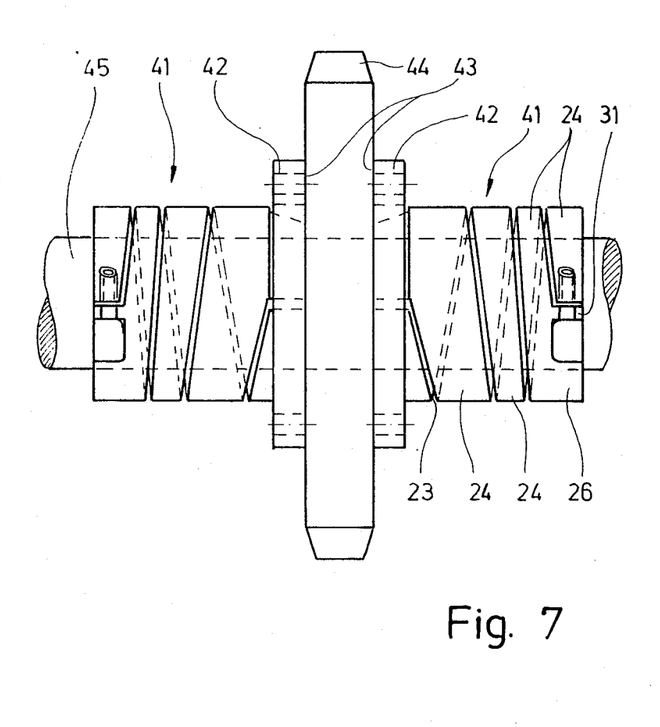
FIG. 7 shows two wrap springs flanged onto a gear wheel from opposite sides.

FIG. 7 then shows an apparatus with two wrap springs 41. These are—as in the exemplary embodiment of FIGS. 5 and 6—in each case connected integrally to a driving flange 42. The connection of the wrap springs 41 to the driving flanges 42 and the design of the individual wrap springs 41 corresponds again to the exemplary embodiment of FIGS. 1 to 4.

The arrangement of the two wrap springs 41 with the respective driving flanges 42 is now made in such a way that a gear wheel 44 is arranged between the two (smooth) end faces 43 of the drive flanges 42, directed away from the wrap springs 41. The said gear wheel is connected to the drive flanges 42, for example by screws (not shown). Through the two wrap springs 41 there is led in this case a continuous shaft 45.

The two wrap springs 41 used here, which are assigned to opposingly directed opposite sides of the gear wheel 44, achieve the effect that, depending on the direction of rotation of the shaft 45, in each case one of the two wrap springs 41 makes possible a torque transmission from the shaft 45 to the gear wheel 44 or vice versa. Thus, depending on the direction of rotation of the shaft 45, alternatively the one or the other wrap spring 41 produces a frictional connection to the respective driving flange 42 and consequently to the gear wheel 44. As a result, the apparatus shown here can transmit a torque in both directions.

Figure 8:
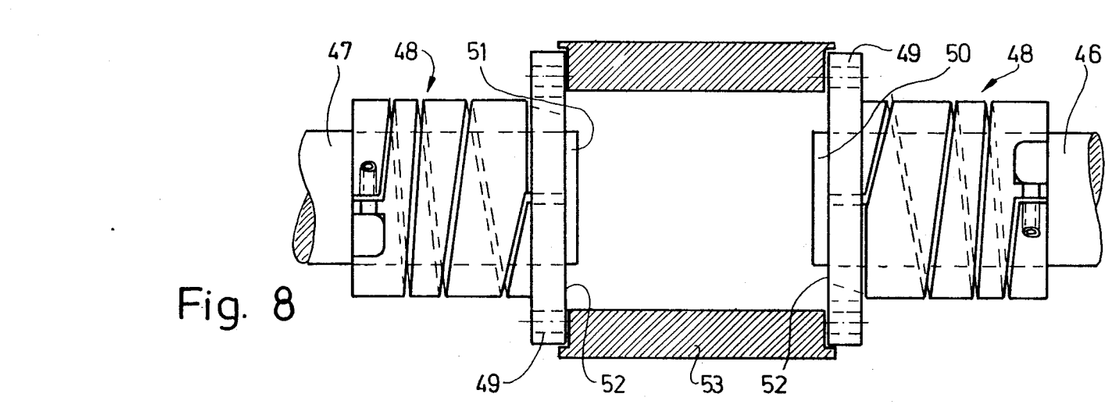
FIG. 8 shows a wrap spring arrangement for the connection of two shafts.
Figure 9:
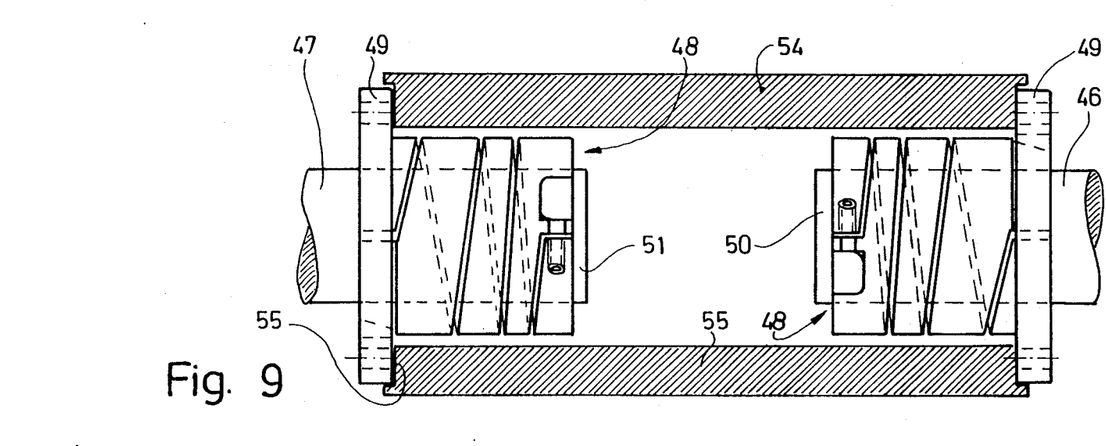
FIG. 9 shows an alternative wrap spring arrangement for the connection of two shafts.

The exemplary embodiments shown in FIGS. 8 and 9 show an apparatus for the torque transmission between two shafts 46 and 47. Both apparatuses have two wrap springs 48, which are connected in each case at one end integrally to a driving flange 49. To this extent, the apparatuses shown in FIGS. 8 and 9 coincide with the apparatus of FIG. 7.

Each wrap spring 48 with the driving flange 49 assigned to it is in this case assigned to one of the opposite free shaft ends 50 and 51, respectively, of the two shafts 46 and 47 to be connected. The (smooth) end faces 52 of the driving flanges 49 directed away from the wrap springs 48 are in this case again directed toward each other in such a way that they run parallel to each other at a distance.

Now the two shaft ends 50 and 51 are connected by an approximately cylindrical connecting piece 53 between the facing end faces 52 of the driving flanges 49. The connecting piece 53 is in this case attached by screws (not shown) to the driving flanges 49. This connection of the two shafts 46 and 47 makes it possible for a torque to be transmitting in one direction of rotation from the one shaft 46 or 47 to the other.

Furthermore, in the exemplary embodiment shown in FIG. 8, the connecting piece 53 may consist of an elastic material. In this case, the apparatus shown makes it possible to compensate for slight alignment errors between the shaft ends 50 and 51, while at the same time drive-related vibrations are eliminated before they are transmitted by the connecting piece 53 to the shaft 46 or 47 to be driven.

The exemplary embodiment shown in FIG. 9 differs from that of FIG. 8 merely in that the free ends 25 of the wrap springs 48 are directed toward each other, that is point toward the respective shaft end 50 or 51. A connection to a correspondingly long connecting piece 54 is performed in this case by the annular end faces 55 of the driving flanges 49, protruding toward the wrap springs 48.

The special feature of the apparatus of this exemplary embodiment is that the wrap springs 48 are in the region of the connecting piece 54, that is they are surrounded by the latter and thus protected by it. Consequently, the connecting piece 54 in FIG. 9 is designed correspondingly longer than the relatively short connecting piece 53 shown in FIG. 8.

Figure 10:
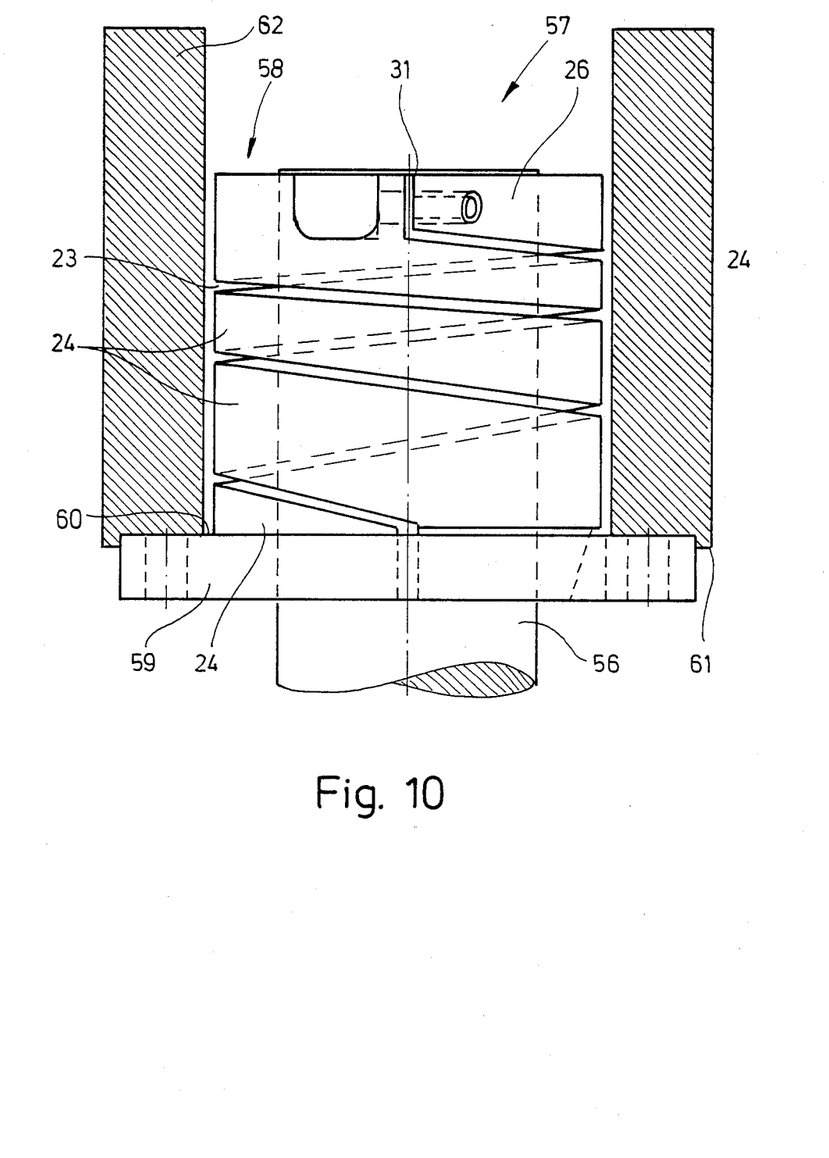
FIG. 10 shows a wrap spring arrangement for the chucking of a tool, namely of a cutter.

Finally, FIG. 10 shows a further use of the apparatus, namely for the chucking of a cutter 56, in a cutting head 57 of a corresponding machine tool. For this purpose, a wrap spring 58 is again connected integrally to a corresponding driving flange 59. The wrap spring 58 and the driving flange 59, arranged thereon, of this embodiment are again designed in an analogous way to the embodiments described above of FIGS. 1 to 4 and 7 to 9.

The cutter 56 has in this case been pushed with its shank from the driving shank 56 completely into the wrap spring 58 and prestressed positively with clamping ring 26. At the opposite end, the driving flange 59 is screwed in the region of its annular end face 60 with a (lower) end face 61 against an annular cutting spindle 62 of the cutting head 57. As a result, in the present exemplary embodiment, the wrap spring 58 is protected inside the hollow cutting spindle 62. Alternatively, it is also conceivable for the apparatus to be turned through 180° and screwed to the cutting spindle 62, as a result of which the wrap spring 58 comes to rest freely accessibly on the underside of the rotating spindle 62. This arrangement has the advantage that the screw (not shown in FIG. 10) is more easily accessible for the prestressing of the clamping ring 26.

As a departure from the exemplary embodiments described here, the apparatus may also be used for the chucking of other tools, for example of a drill, a reamer, or other similar devices. The apparatus of the present invention is not restricted only to a connection of a chain wheel 20 or of a gear wheel 44 to a corresponding shaft. For example, flat belt pulleys, V-belt pulleys coupling parts, and other similar devices, may be connected in a corresponding way to a shaft.

Figure 11:
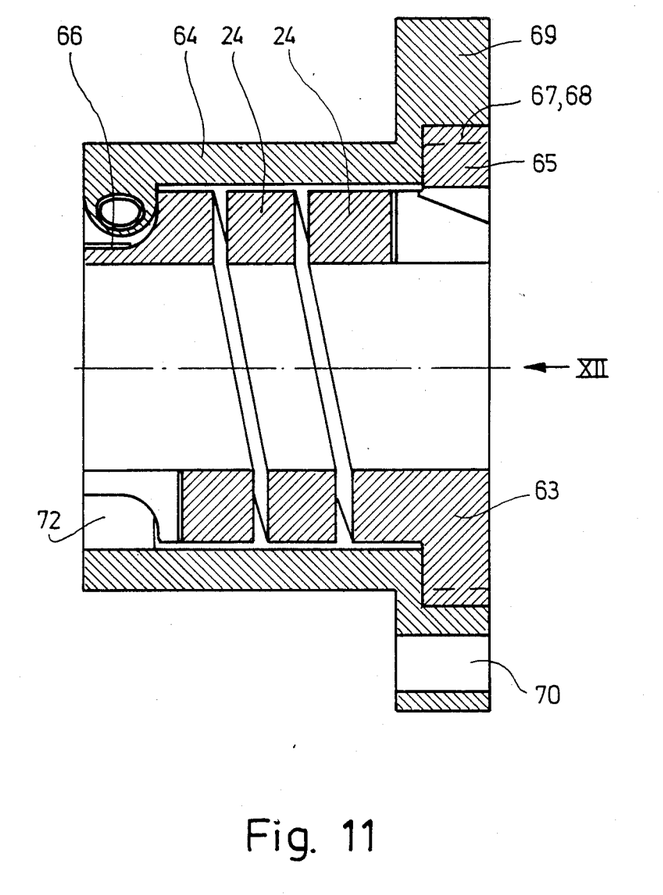
FIG. 11 shows an alternative embodiment of the apparatus in a vertical section.
Figure 12:
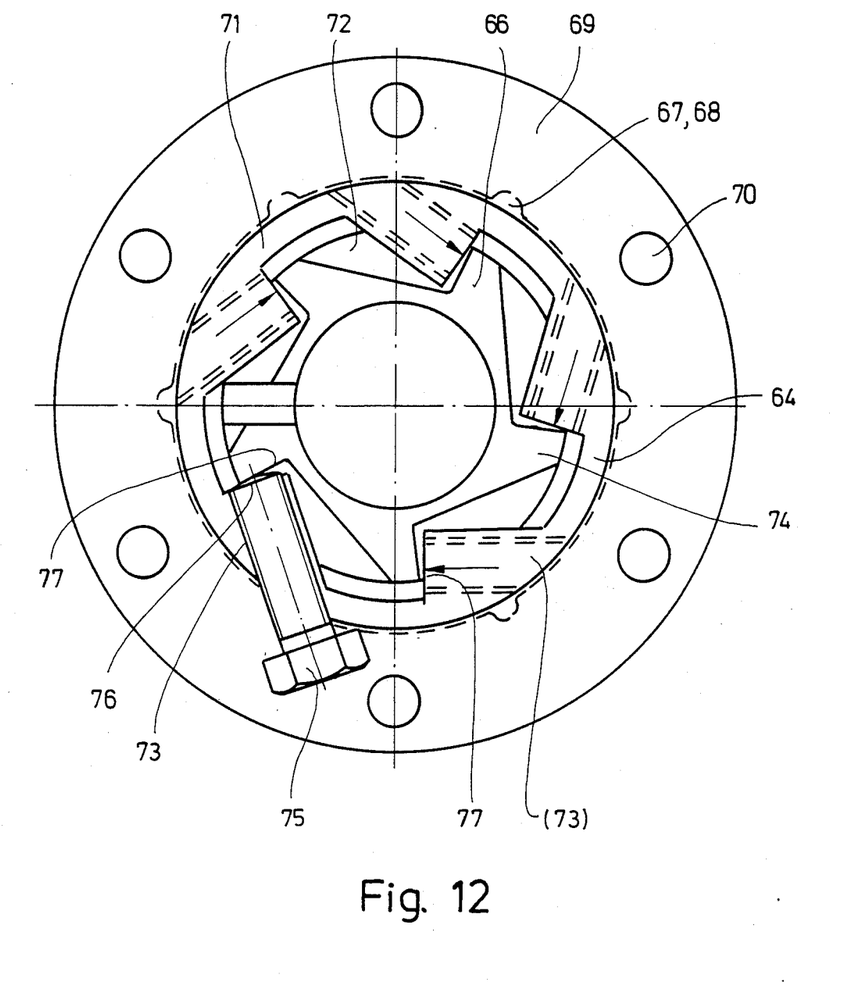
FIG. 12 shows a frontal view of the apparatus in the direction of the arrow XII in FIG. 11.
Figure 13:
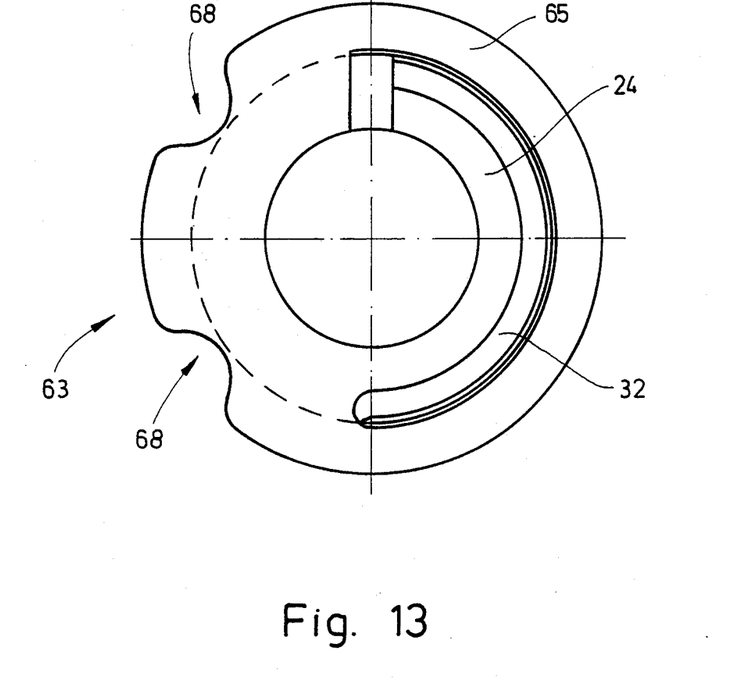
FIG. 13 shows a frontal view of the wrap spring in the direction of the arrow XIII in FIG. 11.

The exemplary embodiment shown in FIGS. 11 to 13 of the apparatus has a wrap spring 63 which is suitable for the virtually slip-free transmitting of a torque in opposite directions. For this purpose, an elastic bracing of the wrap spring 63 is performed by a clamping element assigned to the latter, namely, a clamping sleeve 64.

The windings 24 are designed in the case of the wrap spring 63 of this exemplary embodiment as in the case of the (first) embodiments described above and shown in FIGS. 1 through 4. The driving flange 65 is also connected integrally to the wrap spring 63, the first half winding 24 of the wrap spring 63 being integrated into the driving flange 65 as shown in FIG. 13 by an again semicircular groove 32 in the driving flange 65, which groove delimits the first half winding 24 of the wrap spring 63 from the driving flange 65.

As can be seen in FIG. 11, the clamping sleeve 64 completely surrounds all the windings 24 of the wrap spring 63, for which purpose the clamping sleeve 64 runs approximately over the length of the entire wrap spring 63. The opposite ends of the wrap spring 63, namely, a driving flange 65, shown on the right in FIG. 11, and the opposite free end winding 66 are arrested with respect to each other in a nonrotatable relative position by the clamping ring 64. In this embodiment of the apparatus, consequently the driving flange 65 is used not for directly receiving a gear wheel, or other device, to be driven, but rather for the establishment of a positive connection to the clamping sleeve 64.

This positive arresting of the driving flange 65 on the clamping sleeve 64 is performed by a plurality of elevations 67, which are arranged evenly distributed around the periphery of the driving flange 65 and engage in corresponding recesses 68 of a flange 69 at the corresponding end of the clamping sleeve 64. Alternatively, the positive connection may also be formed by other connecting elements of a usual type, for example a toothing or a polygonal profile. The flange 69 is used for the fastening of a chain wheel, gear wheel or the like (not shown). For this purpose, the flange 69 has a plurality of through-bores 70, spaced and distributed evenly around the periphery of the same.

The free end 71, opposite the flange 69, of the clamping sleeve 64 is likewise connected positively to the free end winding 66 of the wrap spring 63. In accordance with the present invention, this positive connection is designed to be adjustable in such a way that the free end winding 66 can be turned in the direction of the windings with respect to the driving flange 65 of the wrap spring 63, as a result of which the wrap spring 63 with the remaining windings 24 can be pressed firmly against a component (not shown) bearing the wrap spring 63, in particular a shaft or the like, for the transmission of a corresponding torque in the opposite direction.

As can be clearly seen in FIG. 12, for prestressing of the free end winding 66, the free end 71 of the clamping sleeve 64 is provided with radial recesses 72 distributed evenly around the periphery. The recesses 72 are provided with likewise radial threaded through-bores 73, into which clamping screws 75 can be screwed.

The free end winding 66 of the wrap spring 63 is designed correspondingly to the recesses 72 in the free end 71 of the clamping sleeve 64. The said end winding consequently has wing-like cams 74, which engage in the recesses 72 of the clamping sleeve 64 in such a way that they are capable of turning to a certain extent together with the free end winding 66 of the wrap spring 63 in the free end 71 of the clamping sleeve 64, for the prestressing of the wrap spring 63.

The turning of the free end winding 66 of the wrap spring 63 is performed by the screws 75 inserted into the threaded bores 73 of the free end 71, of which one screw 75 is represented in an indicated way in FIG. 12. In this arrangement, the screws 75 bear with their end face 76 against the cam 74, to be precise against corresponding stop surfaces 77 of the same.

Due to the intended mounting of the wrap spring 63 in the clamping sleeve 64, the latter is used not only for the stressing of the opposite ends of the wrap spring 63; rather, the prestressing of the wrap spring 63 is maintained by the clamping sleeve 64, to be precise independently of whether a torque is transmitted from a shaft or a chain wheel or the like (not shown) to the wrap spring 63. Also, the prestressing is equally maintained in the direction of the windings of the wrap spring 63, independently of the direction of rotation of the shaft or of a chain wheel, etc. In this case, the torque to be transmitted between the wrap spring 63 and the shaft on the one hand and a chain wheel or the like on the other hand can be adjusted in dependence on the torque to be transmitted, via the screws 75 in the free end 71 of the clamping sleeve 64.

Alternatively, it is conceivable to provide one end of the clamping sleeve 64 instead of the flange 69 directly with a gear wheel, chain wheel or other similar element or device.

What is claimed is:

1. Apparatus for the torque-transmitting connection of a multitude of elements, in particular for frictional torque transmission between a shaft or the like and a gear wheel or belt pulley or the like, said apparatus comprising at least one wrap spring connecting the elements, said spring having an integrally attached driving flange with part of a winding of said wrap spring formed by a groove or the like in the driving flange and a clamping element enclosing said wrap spring with which the opposite ends of said wrap spring can be braced against each other in the direction of the windings.

2. An apparatus as claimed in claim 1, wherein each wrap spring has a plurality of windings completely surrounding the shaft or the like.

3. An apparatus as claimed in claim 1 or 2, wherein one end of each wrap spring is in connection with the gear wheel or the belt pulley or the like and an opposite (free) end is braced with the shaft or the like or the tool (cutter), in particular by a development of the (final) winding in the form of a clamping ring on the (free) end of the wrap spring.

4. An apparatus as claimed in claims 1 and 2, wherein the windings of the wrap spring are arranged in a hub connected integrally to the chain wheel, the gear wheel or the driving flange, the hub being provided with a continuous groove running around it.

5. An apparatus as claimed in claim 1, wherein the part of the winding of the wrap spring in the region of the driving flange is formed by an arcuate, preferably semicircular groove running along the periphery of the wrap spring in the driving flange.

6. An apparatus as claimed in claim 1, wherein the clamping element is designed as a clamping sleeve enclosing the wrap spring.

7. An apparatus as claimed in claim 6, wherein the clamping sleeve is connected at one end, preferably on the side of a flange formed on it, positively to an end winding, assigned to this end, of the wrap spring, in particular to a driving flange attached preferably integrally to the end winding.

8. An apparatus as claimed in claim 7, wherein the free end winding of the wrap spring has radial cams, which engage with radial clearance in corresponding recesses in the region of the free end of the clamping sleeve.

9. An apparatus as claimed in claim 8, wherein the cams on the wrap spring have stop surfaces for screws screwing into the recesses of the clamping sleeve, for clamping of the wrap spring.

10. An apparatus as claimed in claim 6 or 7, wherein an end of the wrap spring opposite the driving flange connected positively to the clamping sleeve, in particular a free end winding, can be braced from a free end of the clamping sleeve with adjustable clamping force, in particular in the direction of the windings of the wrap spring.

* * * * *